United States Patent [19]

Richards et al.

[11] Patent Number: 5,301,172
[45] Date of Patent: Apr. 5, 1994

[54] METHOD OF STORING USER INFORMATION ITEMS AND APPARATUS FOR REPRODUCING STORED ITEMS

[75] Inventors: Norman D. Richards, Horsham, England; Jozef M. K. Timmermans, Bilzen; Jos G. Schepers, Peer, both of Belgium; Harmen D. Voogd, Best, Netherlands

[73] Assignee: U.S. Philips Corporation, New York, N.Y.

[21] Appl. No.: 976,107

[22] Filed: Nov. 13, 1992

[30] Foreign Application Priority Data

Nov. 15, 1991 [GB] United Kingdom ............. 9124337

[51] Int. Cl.⁵ .................................................. G11B 17/22
[52] U.S. Cl. ............................................... 369/32; 369/47
[58] Field of Search ................. 369/32, 33, 34, 36, 369/47, 48, 49, 50, 54, 58, 59

[56] References Cited

U.S. PATENT DOCUMENTS 5,157,646 10/1992 Amemiya et al. ................... 369/47

FOREIGN PATENT DOCUMENTS 0346979 12/1989 European Pat. Off. .

OTHER PUBLICATIONS

"Compact Disc-Interactive" A Designer's Overview, edited by Philips and published by Kluwer Technical Books, ISBN 90 201 21103, 1988.
Hubbard: "The Photo CD System: An Overview For Consumer and Photofinishing Applications", pp. 316–317, 1991.
Petruzelli et al: "PVC-1: Photo CD Video Controller ASIC", pp. 320–321, 1991.
Richards: "Photo CD and CD-I: A Marriage Of Great Convenience", pp. 322–323, 1991.

*Primary Examiner*—Robert J. Pascal
*Assistant Examiner*—Ali Neyzari
*Attorney, Agent, or Firm*—Michael E. Marion

[57] ABSTRACT

A reproducing apparatus has means for reproducing for a user images and audio items stored on a record carrier (compact disc). The apparatus is controlled by a simple microcontroller running a predetermined program. To enable items to be presented to the user in a reproduction sequence with user-selected branching, the desired reproduction sequence is broken into selection points and linear reproduction sequences. A selection item is stored on the disc for each selection point, while a sequence item is stored for each linear reproduction sequence, these sequence and selection items containing further item references to link them into the described composite reproduction sequence. The logic and storage requirements imposed on the microcontroller are minimal.

28 Claims, 6 Drawing Sheets

METHOD OF STORING USER INFORMATION ITEMS AND APPARATUS FOR REPRODUCING STORED ITEMS

BACKGROUND OF THE INVENTION

The invention relates to a method of storing user information items on a record carrier for subsequent presentation to a user, and to a record carrier whereon information items have been stored by such a method.

The invention further relates to an apparatus for reproducing user information items stored on such a record carrier, the apparatus including means for reading and reproducing user information items from specified locations on the record carrier and control means for reading control information from the record carrier and for specifying to the reproducing means the locations of user information items to be reproduced.

One known apparatus of the above type is the compact disc (CD) player for reproducing items of audio information, where the control information comprises a "table of contents" of stored items. In particular, however, a recording CD player is described in EP-O 346 979 A2 (PHQ88018) in which control information stored on the disc includes a list of track numbers defining a user's preferred reproduction sequence for the recorded items. The apparatus is then controlled by a simple microcontroller to reproduce the items in accordance with the stored list, notwithstanding that the items are stored in a different order within the continuous time sequence defined by the spiral track on the record carrier (CD).

A low cost apparatus which can reproduce images as well as sounds from a CD is the forthcoming Photo CD player, described in various papers at the IEEE International Conference on Consumer Electronics 1991, see ICCE '91 Digest of Technical Papers, pages 315–323.

There are also today several so-called multimedia computer-based systems which can reproduce images, sounds and text from CD record carriers, including in particular the Compact Disc-Interactive system (CD-I). A CD-I player is commercially available from Philips Consumer Electronics in Knoxville, Tenn. These multimedia systems include powerful microprocessors and specialised peripheral circuits, running under control of a real-time operating system and application programs loaded from the disc, and can implement many styles of user interaction, including multi-level menus and the like, to provide rapid access to the large amount of information stored on the disc. CD-I and other fully-featured multimedia systems are inevitably more expensive both in the cost of the consumer apparatus and the effort involved in organising and storing information on the record carriers.

Such a level of interactivity cannot be provided in low-cost systems such as Photo CD and audio CD, chiefly because the control means is limited typically to an 8-bit microcontroller running a small predetermined control program stored in read-only memory (ROM). Such a microcontroller cannot generally accept new programs from the record carrier, and cannot process data read from the disc at the full CD data rate.

SUMMARY OF THE INVENTION

Nevertheless, it is an object of the invention to store user information items with control information in such a way for example that at least a limited menu-tree structure can be given to the reproduction sequence, while remaining within the capabilities of low-cost reproducing apparatus such as the Photo CD player.

The invention provides a method of storing a plurality of user information items on a record carrier for subsequent presentation to a user, the method including the steps of:

storing the plurality of user information items at addressable locations on the record carrier;

defining a desired composite reproduction sequence for the user information items, the composite reproduction sequence comprising at least two linear reproduction sequences and at least one selection point at which the desired composite reproduction sequence can branch to one of a plurality of alternative reproduction sequences dependent on a user selection response;

for each linear reproduction sequence in the desired composite reproduction sequence defining and storing on the record carrier a sequence item comprising an ordered list of references to user information items stored on the record carrier; and for each selection point in the composite reproduction sequence defining and storing a selection item including a selection list comprising for each user selection response a reference to a stored sequence item or selection item.

The invention further provides a record carrier, for example an optical disc in the CD-ROM-XA format, wherein user information items, for example images and sounds, have been stored in accordance with the invention as set forth above. The CD-ROM-XA "bridge" format for example allows application programs for CD-I and PC-based reproduction apparatuses to be stored on the same disc as Photo CD data, but invisible to the low-cost Photo CD player.

The invention yet further provides an apparatus for reproducing user information items stored on a record carrier in accordance with the invention as set forth above, the apparatus including means for reading and reproducing user information items from specified locations on the record carrier and control means for reading control information from the record carrier and for specifying to the reproducing means the locations of user information items to be reproduced, the control means including sequence and selection activation means, selection control means and sequence control means, wherein:

the activation means comprises means for receiving an item reference and for (i) in the event that the received item reference is a reference to a selection item activating the selection control means in respect of the said selection item and (ii) in the event that the item reference is a reference to a sequence item activating the sequence control means in respect of the said sequence item;

the selection control means comprises means for in respect of a given selection item receiving a user selection signal, identifying a corresponding item reference in the selection list of the given selection item and supplying the corresponding item reference to the activation means; and the sequence control means comprises means for in respect of a given sequence item causing the reproduction of stored user information items in a linear reproduction sequence as defined by the ordered list of item references in the given sequence item.

By use of the invention in the Photo CD system, for example, electronic picture books can be implemented with access to 'chapters' and 'sub-chapters' controlled by menu selections. Such picture books may be of use for education, entertainment, sales information and so on. Text information can be included by spoken audio items or by written text images stored in the same format as photographs.

The definition of selection items and sequence items following a predetermined format allows a wide variety of composite reproduction sequences to be implemented using only simple general purpose control means in the player. In practice this involves a simple addition to the preprogramming of the microcontroller.

To enable presentation of a menu image and/or an audible menu description, a user selection information item may be stored on the record carrier, to be presented to a user at the at least one selection point, the corresponding selection item including a reference to the stored user selection information item. In the reproducing apparatus, the selection control means may then further include means for identifying in the given selection item a reference to a user selection information item and for causing reproduction of the user selection information item prior to receipt of user selection signals.

In one embodiment, there are a number of distinct types of user information item and the or each selection item includes fields for references to one item of each type to be presented to the user at the selection point. This allows a fixed format to be defined for the selection item, simplifying the operation of the reproducing apparatus. Null references can be stored where no item of the relevant type is required.

Each stored sequence item may include a field for a next action reference defining a continuation of the composite reproduction sequence after the linear reproduction sequence defined by the said sequence item. In the reproducing apparatus, the sequence control means can then include means for at the end of the linear reproduction sequence supplying to the activation means an item reference read from the next action field of the sequence item. The reproduction sequence can thus continue indefinitely, as desired, and may be recursive. An advantage of this embodiment is that the control means need not store information about the overall structure of the composite reproduction sequence: the local structure defined by one sequence or selection item is sufficient.

Each sequence item may include a field for a previous action reference referring to a selection item or sequence item preceding the stored sequence list in the composite reproduction sequence. In the reproducing apparatus, the sequence control means can then include means responsive to a previous action signal received from the user during reproduction of a user information item to cause a return to a previous user information item in the sequence, and in the event that the previous action signal is received during reproduction of the first item in the sequence, supplying to the activation means an item reference read from the previous action field of the sequence item. It is then possible for the user to step backwards in the reproduction sequence, even beyond the beginning of a linear sequence, at the same time avoiding the need for the control means to remember for itself the history of the reproduction sequence.

For stepping to previous or next items within the sequence, specific entry points may be defined comprising a subset of the item references in the sequence list. This is particularly advantageous for example where audio information items in the sequence are associated with corresponding image items.

Each selection item may similarly have a field for a previous action reference. In addition to references to items corresponding to express selection responses received from the user, the selection item may include fields for any or all a default action reference, an error action reference, and a time-out action reference. A time-out period may be predetermined or specified in a field of the selection item. The above references can be gathered in predetermined fields a fixed-length portion of the selection item, simplifying their interpretation by the reproducing apparatus. The selection item may also indicate that a random selection is to be made, either immediately or after a time-out period.

The sequence item may include a variable-length list of item references. This list could be delimited by a terminating code, but in the preferred embodiment a value is stored in the sequence item giving the number of item references in the sequence list. A similar value stored in a field in the selection item can give the number of item references corresponding to specific user selection responses.

A feature of recordable optical discs and other recordable media is that information can be added to the disc or other carrier at a later date. Such later information may in particular include new user information items and selection and sequence items, additional to those previously stored, while certain other control information is effectively replaceable with updated information on each occasion that information is added. In a particular method according to the invention, at least one reference to a sequence or selection item is an indirect reference via a field in the replaceable control information. The activation means in the reproducing apparatus can be constructed to recognise the indirect item reference, and to obtain a direct item reference by reference to the replaceable control information. In this way, items stored in a first storage session can refer indirectly to an item stored at a later date, so that a single composite reproduction sequence is defined even though the sequence and selection items are stored in separate sessions.

In particular, the replaceable control information may include a carrier description table having a field for an entry point item reference referring to a sequence or selection item which defines an entry point to the composite reproduction sequence, at least one reference to the said item comprising the said indirect reference. When the control information is replaced in a later session, the indirect reference becomes a reference to a new entry point item.

In the event that a reproducing apparatus may include a pointer-type selection facility, whereby selection areas are defined on a displayed menu image, the method according to the invention may further comprise the steps of (i) defining for a given selection point a set of selection areas on a menu image corresponding to at least a subset of the user selection responses possible at the given selection point and (ii) storing in the selection item corresponding to the given selection point a selection areas list identifying each defined selection area. The selection areas list can be used by a suitably equipped reproducing apparatus, and can be ignored by other apparatuses.

These and further advantageous features will be apparent to the skilled reader from a consideration of the dependent claims and the following description.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
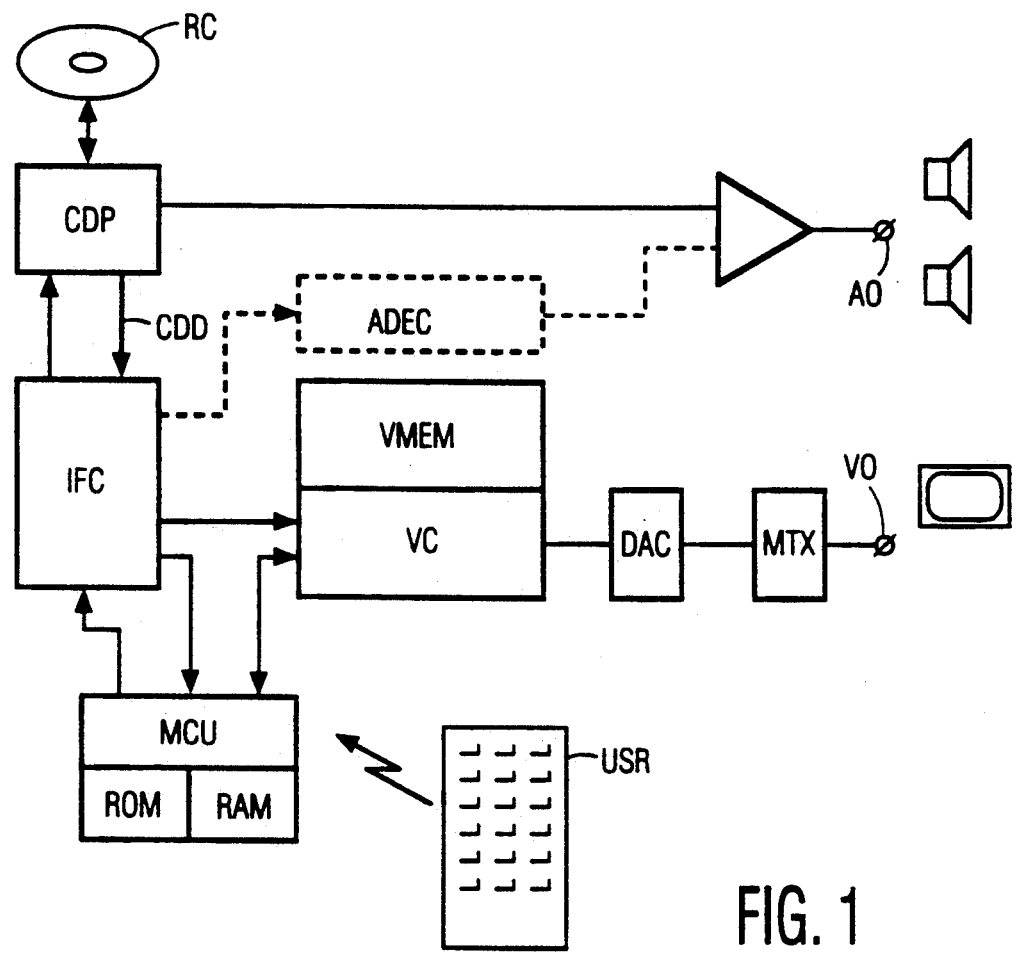
FIG. 1 shows in block form a reproducing apparatus according to the invention.

FIG. 1 shows the basic structure of a reproducing apparatus for images and sounds stored on a CD-ROM type of optical record carrier RC. A substantially conventional CD player module CDP contains the optical disc drive and the decoding electronics to produce audio signals at a stereo audio output AO. The module CDP can also supply non-audio CD data CDD via an interface module IFC to a video controller module VC. The video controller module VC has coupled to it a large random access memory VMEM (for example 256K by 16 bits DRAM) for storage of image data, and drives a video output VO by means of a triple digital-to-analogue converter DAC and a matrix circuit MTX. The interface module IFC and the video controller module VC can be integrated in a single chip if desired, as described by C. Petruzelli et al in "PVC-1: Photo CD Video Controller ASIC", ICCE 1991 Digest, pages 320–321.

The apparatus as a whole is controlled by a 8-bit microcontroller, of any widely available type, operating in accordance with a program stored in read-only memory ROM. A few kilobytes of read-write memory RAM are provided for storage of status variables, index information and so forth. User command signals are received from a remote handset USR in a conventional manner, including numeric key entries, 'play', 'stop', 'next' and 'previous' commands.

The microcontroller MCU receives low-bandwidth control information from the player interface module IFC, which can be read from the CD-ROM record carrier RC in the form of the conventional low bandwidth subcode information, but can also be derived from special microcontroller-readable (MRS) data sectors stored on the CD-ROM. The MRS data is effectively stored at a lower density than normal CD-ROM data, by repeating every byte four times, as described by Petruzelli et al. Given the constant data rate of 150 kbytes per second when reading from a CD-ROM, this enables low bandwidth data to be supplied from the carrier RC to the simple 8-bit microcontroller.

User information items such as images and audio data items are stored at normal density and hence cannot be processed via the microcontroller MCU. However, the MCU can specify the locations of user information items to be reproduced, and cause the modules CDP and VC to reproduce the audio and/or image items accordingly. For this purpose, the present embodiment uses the timecode values (minutes, seconds, frames) which are carried in the Q-subcode throughout the spiral recording track of a CD-ROM record carrier (as described in EP-0 346 979-A2, mentioned above) and also are encoded in the head of each CD-ROM data sector.

Figure 2:
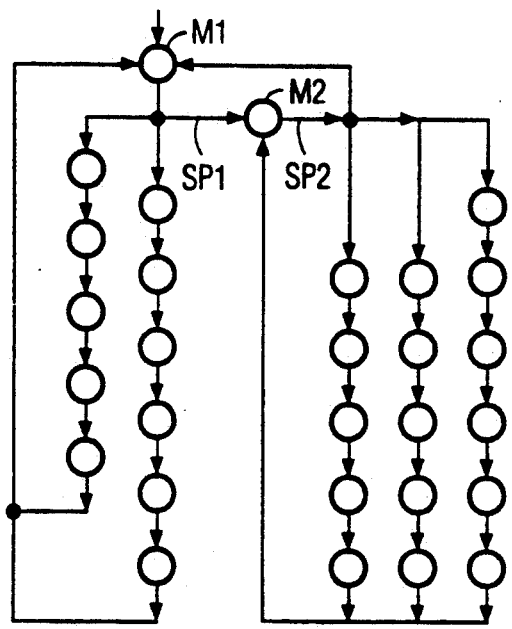
FIG. 2 illustrates a desired composite reproduction time sequence including user-controlled branching.

FIG. 2 illustrates a desired composite reproduction sequence for a plurality of user information items, in particular images and sound items. Each item to be reproduced is represented by a circle, and the flow of the desired sequence from item to item is indicated by the directed like segments. At selection points SP1 and SP2, the desired sequence can follow one of several alternative paths, depending on user choices made at the time of reproducing the sequence. In connection with the selection points two items M1 and M2 are identified as audio and/or visual menu presentation items, for presenting selection information to the user. Each alternative path involves a linear sequence comprising a greater or lesser number of image and/or audio items, followed by a return to one or other of the selection information items M1 or M2 and selection point SP1 or SP2.

Figure 3:
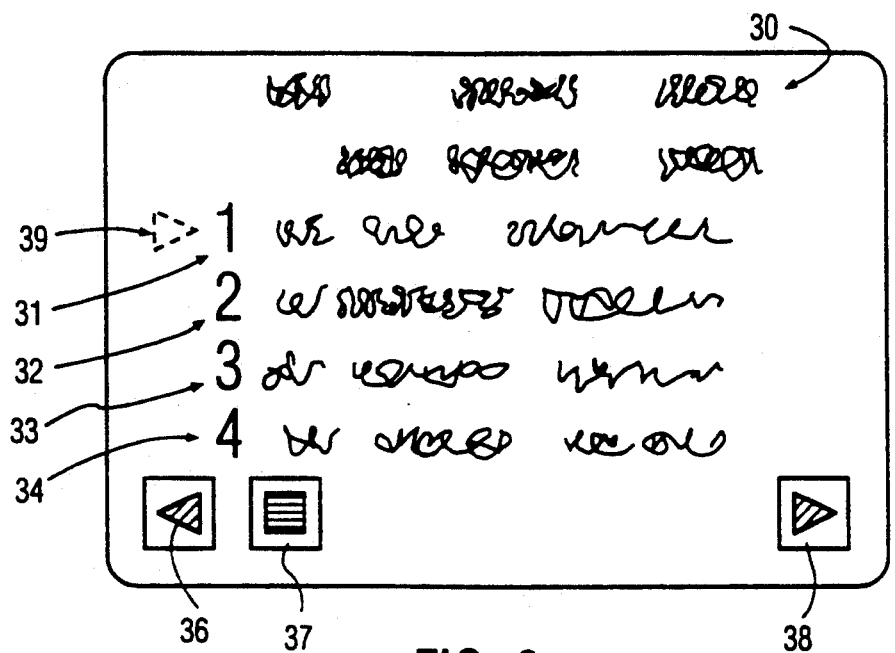
FIG. 3 shows an example menu image for presentation to a user of the apparatus of FIG. 1.

FIG. 3 shows an example menu image to be stored on the disc and reproduced prior to a selection point in the reproduction sequence. The image comprises a textual heading 30, and four textual menu options 31–34, each associated with a numeric user response 1, 2, 3 or 4. Icons 36, 37 and 38 at the foot of the screen indicate further possible user responses previous, stop and next respectively. A further icon 39 indicates that option 1 is a default option on this menu. While this image is similar in appearance to a typical user interface screen of a true multimedia system, it should be noted that the image described is nothing more than a coded image, not a true interactive display. Thus there is no immediate feedback to the user by highlighting icons or options, nor many other features of true multimedia systems, but, provided the menu structure is kept relatively straightforward, this is not a problem.

The menu image item is coded simply as a natural image, the same as any Photo-CD image. This could clearly be achieved by photographing a caption on paper or card, but better results will be obtained by generating the coded image directly from the output of a computer "paintbox"-type program.

Figure 4:
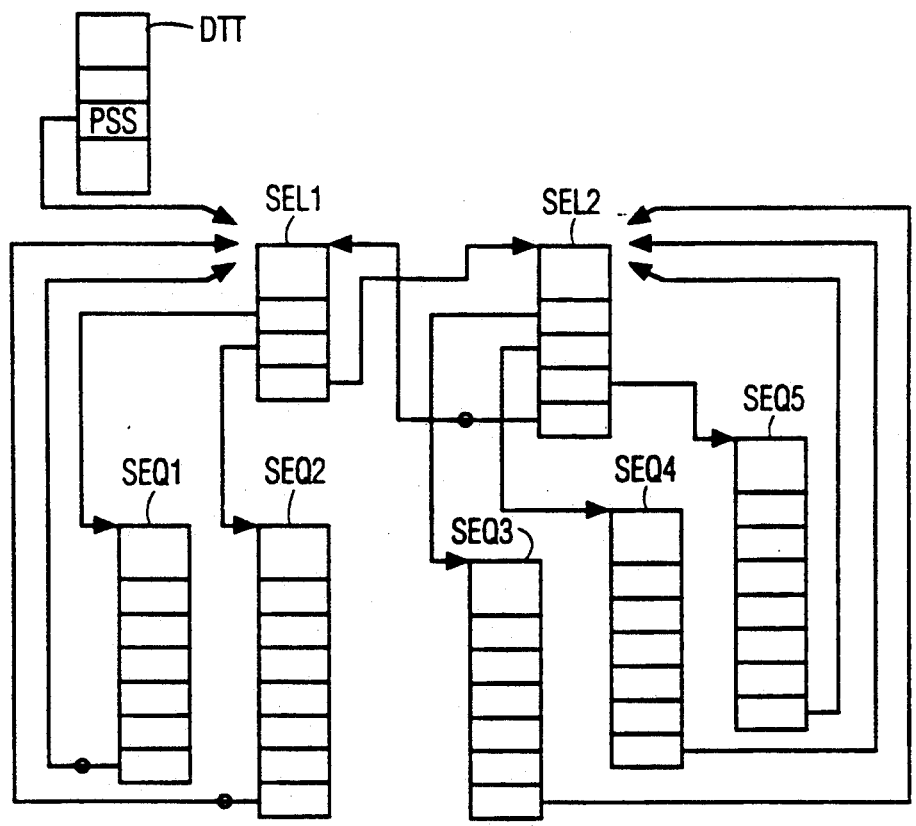
FIG. 4 shows the definition of the sequence of FIG. 2 by a collection of selection items and sequence items in accordance with the invention.

FIG. 4 illustrates how the desired reproduction sequence shown in FIG. 2 can be broken into components and defined in terms of two classes of item: selection items SEL1 and SEL2 and sequence items SEQ1 to SEQ5. Each selection item SEL1/SEL2 corresponds to the combination of a selection point SP1/SP2 and the image and sound items M1/M2 that present the selection information (menu) for that selection point. The selection item SEL1 corresponds to the starting point or root of the composite reproduction sequence, and is identified as such by a play sequence and selection pointer PSS in a field of a disc description table DDT stored at a predetermined location on the record carrier. Each sequence item SEQ1/ . . . SEQ5 corresponds to a linear sequence of image/sound items. For each possible path from a selection point, the corresponding selection item includes a list of references to the items which are to be reproduced on that path. At the end of each sequence item, there is a reference to an item defining the next action in the composite reproduction sequence. The structure of these items of control information will now be described in detail with reference to FIG. 5.

Figure 5:
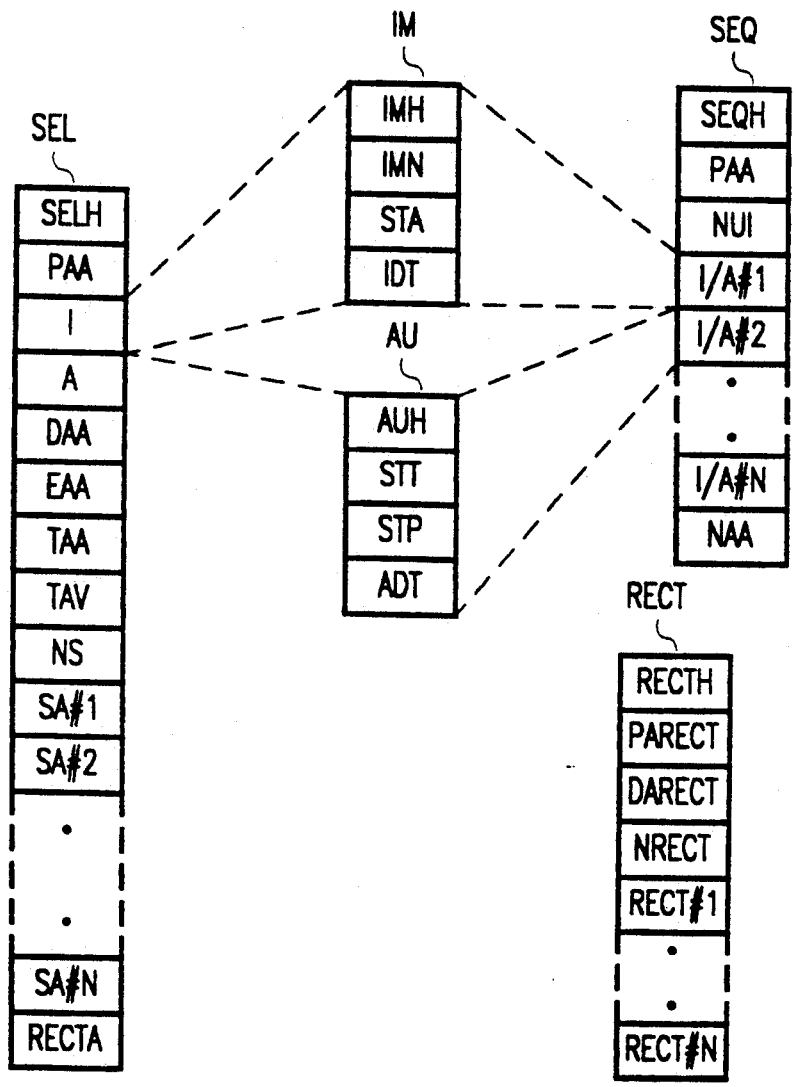
FIG. 5 shows formats for the storage of a selection item, a sequence item, an image item reference, an audio item reference and a selection areas item.

FIG. 5 shows the standard formats for a selection item SEL, a sequence item SEQ and two user information item references IM and AU.

The selection item SEL is a block of data beginning with a selection item header SELH, which distinguishes it from sequence items and other data structures. The item SEL is distinguished from other items of the same type only by the location at which it is stored on the record carrier. The header is followed by a previous action reference in the form of an address PAA of an item corresponding to a step backwards in the reproduction sequence. The address PAA defines the location on the record carrier of the header of a selection item (format SEL) or a sequence item (format SEQ). In accordance with the conventional CD-ROM format, time codes (minutes, seconds, frames) are stored in a header of each data sector, and also in the Q-word of the sub-code. Module CDP can use the stored codes to access any sector on the disc.

After the previous action reference PAA there is space for references to two user information items stored on the record carrier: an image item reference I and an audio item reference A. These have the formats IM and AU respectively, and essentially identify the address of the user selection information items which are to be presented to the user at the selection point. If no image is to be displayed, and/or no audio item played, at the selection point, the corresponding field I and/or A can be set to a null value accordingly.

The first, fixed-length portion of the selection item continues with fields DAA,/EAA,/TAA, TAV and NS, to be described later, followed by the main variable-length portion. This latter comprises the references SA#1 to SA#N which give the addresses of sequence or selection items defining the reproduction sequence for a number of alternative user selection responses. For this purpose, there is a direct correspondence between the references SA#1 to SA#N and numeric selection entries made by the user during using the remote control handset USR. Field NS gives the number of entries in the list of item references SA#1 to SA#N, and hence defines the length of the variable length portion of the selection item SEL. After the end of the variable length portion of the selector item a field RECTA is optionally provided, to be described later with reference to FIG. 9.

Returning to the main fixed-length portion of format SEL, field DAA is for a default action reference comprising the address of a sequence or selection item to be accessed when the user responds without selecting a specific menu option by numeric entry. For example, the first option on the menu might be selected by pressing '1' followed by 'PLAY' on the handset USR, but equally the first option may be a default selection that can be selected by pressing 'PLAY' alone. In such a case, the field DAA will be identical to field SA#1.

Field EAA is an error action reference, comprising the address of a sequence or selection item to be accessed when the user makes a mistake in their response, for example by keying an a number greater than NS. This error action reference EAA may cause the current selection item to be repeated, or may preferably point to a small sequence of items aimed at helping the user make a correct selection.

Field TAA is a time-out action reference comprising the address of a sequence or selection item to be accessed in the event that no user response is received within a time period specified in the time-out value field TAV, after display of the image item referred to in field I and playback of the audio item referred to in field A. Depending on the application, the field TAA may often be identical to the default action field DAA. In other applications, however, the expiry of the time-out period may trigger a sequence giving help to the user on how to make a selection, or may cause the activation of a continuous demonstration sequence, in particular for applications giving information at point-of-sale.

A sequence item, format SEQ, begins with a header field SEQH to distinguish it from other types of item, but is distinguished from other items of the same format by the address of its location on the record carrier. A previous action reference field PAA is again provided to allow reference backwards in the reproduction sequence. The next field NUI specifies the number of user information items in the linear sequence defined by this sequence item SEQ, and thus defines the length of the following variable-length portion of the sequence item SEQ.

The variable length portion of the sequence item SEQ comprises a list of references I/A#1 to I/A#N to user information items (image or audio), stored elsewhere on the record carrier, and ends with a next action reference NAA, comprising the address of a selection or sequence item to be accessed after completion of the linear reproduction sequence defined by the list. Typically, the list might comprise image an item references followed by a reference to an audio item to be played while the image is viewed. However, lists comprising entirely audio items or entirely image items are possible, according to the needs of the application.

Each user information item reference I, A or I/A in the embodiment described has the format IM or AU shown in FIG. 5, according to whether it is a reference to an image item or an audio item respectively. An image item reference (format IM) comprises a header field IMH identifying it as such, and an image number field IMN, which refers to the desired image by its Photo CD image number, unique among the images stored on a Photo CD disc. The next field STA comprises three BCD-coded bytes and gives the starting address of the area on the record carrier where the image is stored. The last field IDT gives the delay time to be implemented after display of the image, before moving to the next item in the sequence An audio item reference (format AU) comprises an audio item reference header AUH and fields STT, STP and ADT. Field STT contains the start address of the audio item to be played, and field STP the stop address, again, three BCD bytes to encode the standard CD timecode format: minutes, seconds, frames. Each second of playback contains 75 frames. Field ADT defines a delay time to be implemented after playback of the audio item, before moving to the next item in the sequence.

The delay time fields IDT and ADT comprise only one byte each, but can express a wide range of time values as follows. If the most significant bit (MSB) of the field is a "0", then the remaining seven least significant bits (LSBs) give the time in units of 0.5 second. If the MSB is a "1", then the seven LSBs give the time delay in units of 4 seconds, unless byte is all ones: "11111111", in which case the delay is infinite. Thus the encoded delay can be zero or infinite and in between can vary from as little as 0.5 second to over 8 minutes.

Figure 6:
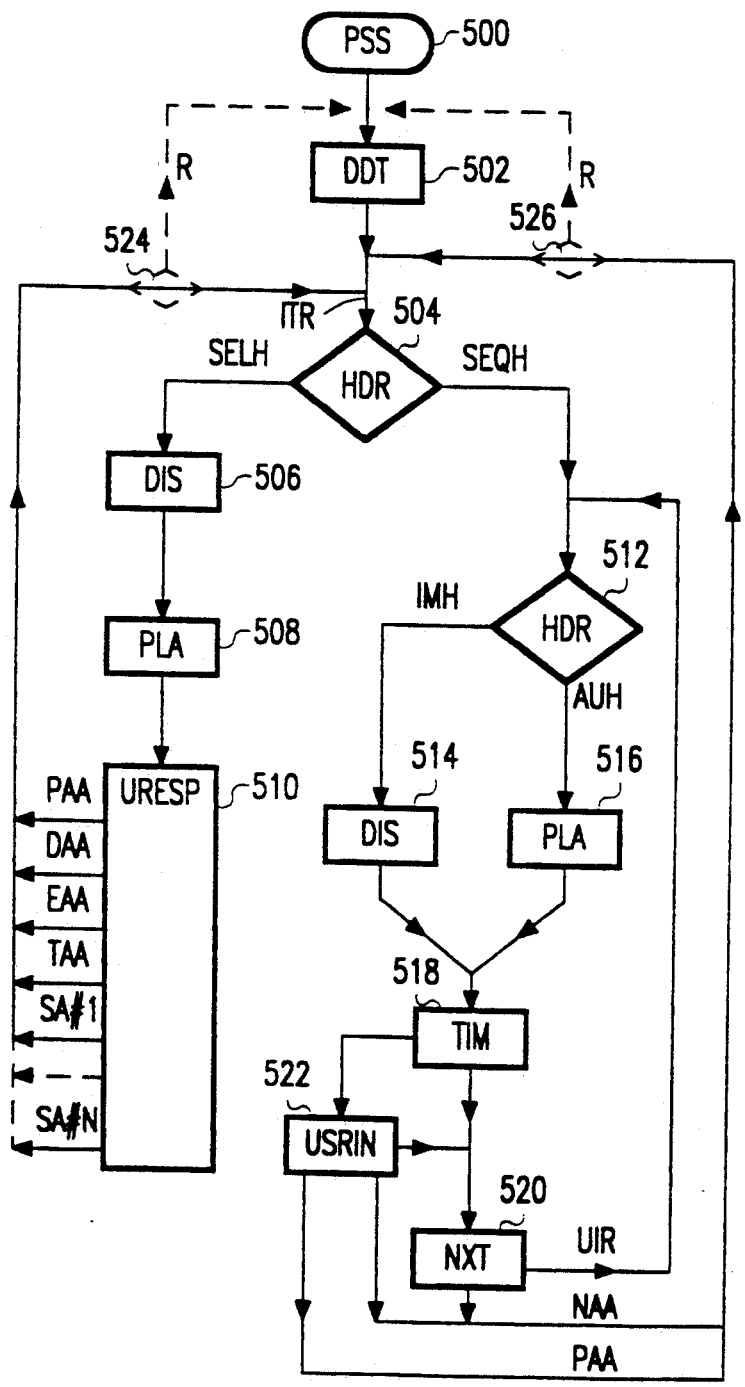
FIG. 6 is a flow chart illustrating operation of the apparatus of FIG. 1.

FIG. 6 is a flowchart of operation in the reproducing apparatus, showing how stored selection and sequence items can be used to control the reproduction of user information items by a simple microcontroller having only limited processing and storage capability. The microcontroller MCU operates to control the apparatus in accordance with the following numbered steps:

500: After loading the record carrier, the user requests playback of information in accordance with prerecorded selection and sequence items. This may be an expressly commanded, or it may be a default consequence of the command 'PLAY'.

502: From the disc description table area DDT of the carrier, the player reads the address PSS of the root sequence/selection item which becomes an item reference ITR for the step 504.

504: The header of the item referred to by the reference ITR is read to determine whether the item is a selection item (format SEL) or sequence item (format SEQ).

506: If the reference ITR is to a selection item (format SEL), the microcontroller finds the reference I (format IM) for the image to be displayed at the selection point and (if not a null reference) causes display of the image referred to.

508: The microcontroller causes playback of audio from the start address (if not null) found in the audio item reference A (format AU).

510: The microcontroller starts the time-out timer in accordance with value TAV found in the sequence item (format SEQ) and waits for user input. A new item reference ITR is generated according to the uset's response, using the appropriate one of the fields PAA, DAA, EAA, TAA and SA#1 to SA#N found in the sequence item. This is fed back to step 504.

512: If the reference received at step 504 is to a sequence item (format SEQ), the header of the first item reference I/A#1 is examined to determine whether the user information item is an image or an audio item.

514: For an image item reference, the image item referred to is displayed, using the start address STA from the item reference (format IM).

516: For an audio item, playback of the item is caused to commence, from the address STT to the address STP found in the audio item reference (format AU).

518: The microcontroller begins counting the time delay (if any) specified in field IDT or ADT of the user information item reference (format IM or AU, as the case may be).

520: The time delay has expired. The next user information item reference in the sequence item is supplied (UIR) to the step 512. If the sequence list is finished, the next action reference NAA is read from the appropriate field in the sequence item and supplied to step 504.

522: User input has been received from the handset USR, interrupting the time delay. If the user signals 'previous' or 'step back', then the preceding image item reference is found and supplied (UIR) to step 512. If there is no previous image item in the list, the previous action reference PAA is supplied to step 504. If the user signals 'next', the time delay is skipped and the next user information item reference in the list is supplied (UIR) to step 512. If there are no more user information item references in the list, the next action reference NAA is supplied to step 504.

The skilled reader will appreciate that this simple programming of the microcontroller MCU is sufficient for the implementation of complex reproduction sequences that can continue to branch and be-divergent or convergent as desired. In particular, the microcontroller MCU is not required to store indefinite quantities of information to find its way back and forth through the compound reproduction sequence: all the necessary information is contained in the present selection or sequence item, with its previous action and next action references. In contrast, for example, implementation of subroutines or like structures would require the microcontroller to keep a variable-sized 'stack' of return addresses in its memory RAM. On the other hand some compound sequences that could be simply expressed using subroutines may be impossible to define without substantial repetition of some selection items or sequence items. This is a minor penalty considering the amount of space available on a CD-ROM type record carrier, in return for simplicity of the reproducing apparatus.

One feature of the Photo CD system described so far is that the information on a disc can be added to at a later date without overwriting the existing information ("write once"). In accordance with the CD-ROM-XA standard, as it applies for example to Photo CD, this added information is included in a separate "session" on the disc, with its own disc description table and play sequence and selection (PSS) information. There will now be described the features of the present embodiment which enable selection and sequence information of older sessions to be incorporated efficiently with that of newer sessions.

Figure 7:
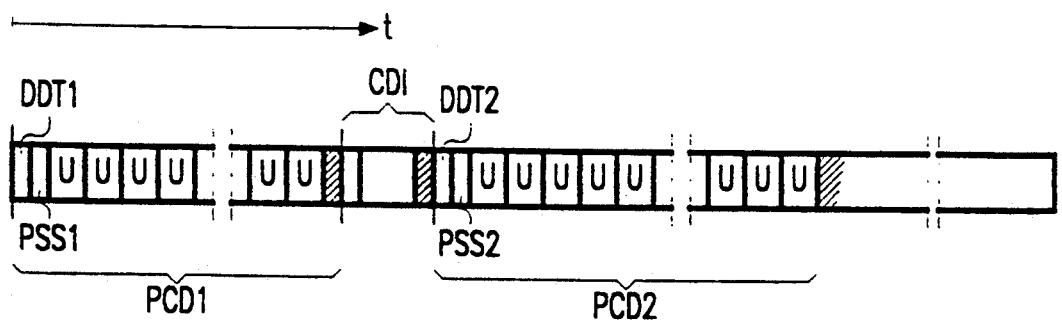
FIG. 7 shows the arrangement of information stored on a record carrier in two storage sessions in accordance with the invention.

FIG. 7 illustrates schematically the arrangement of data on a record carrier on which user information items and control information have been stored in two separate sessions. The time code address (t) increases from left to right, following the spiral recording track from the centre to the edge of the optical disc. A first Photo CD session has been recorded in the area PCD1. This area includes a disc description table DDT1, and in an area PSS1 includes play sequence and selection items (formats SEQ and SEL) as described above with reference to FIGS. 4 and 5. The control information in areas DDT1 and PSS1 is stored at low density, to be read by a microcontroller such as that in the player of FIG. 1. The main part of the area PCD1 comprises user information items "U" stored at high density. Image items, all the same size and resolution, will tend to occupy equal amounts of storage spaces as shown. Audio items, and images of different size and resolution, will occupy unequal amounts of space, but all are addressable by means of their time code location.

An area CDI comprises a separate "session" and is occupied by programs for controlling a fully-featured interactive apparatus such as a CD-I player to access the user information items U. These programs are stored at full density to be downloaded and executed by the CD-I player but are completely ignored by microcontroller of the Photo CD player (FIG. 1). Further sessions can be stored for yet other reproducing apparatuses.

At a later date, further user information items U are stored in a second Photo CD area PCD2. This area has its own disc description table DDT2 and further sequence and selection items are stored in an area PSS2. In operation, a player is arranged for simplicity to look only to the latest disc description table, which can be used as a key to access stored user information items from all the earlier session(s) as well as the latest session. As one aspect of this, the second disc description table DDT2 will contain a field PSS pointing to a root item (sequence item or selection item) in the area PSS2. Without duplicating substantially all of the area PSS1 from the first session, how can the author of the second (and subsequent) sessions(s) incorporate the compound reproduction sequence defined there into that defined in the new area PSS2?

Figure 8:
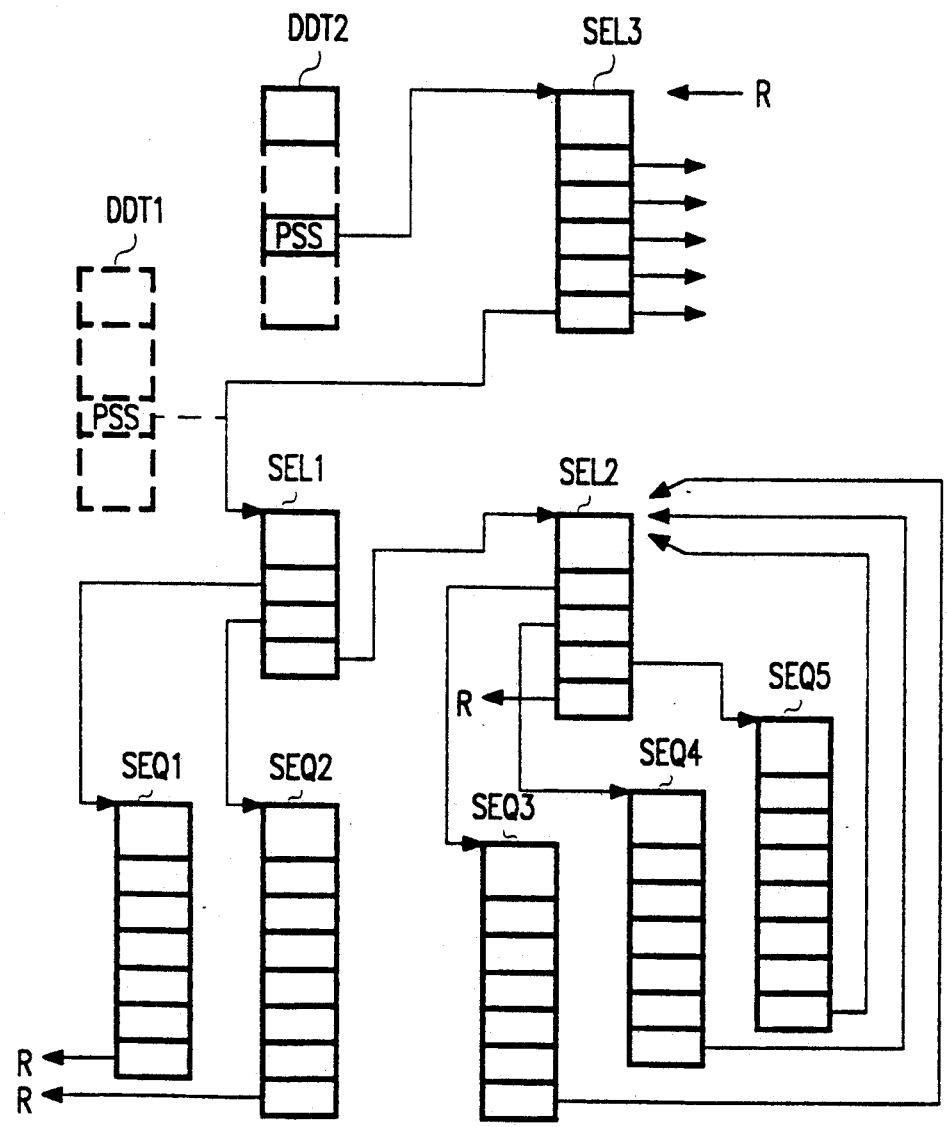
FIG. 8 illustrates the addition in a subsequent storage session of further reproduction sequence and selection items to those shown in FIG. 4.

FIG. 8 illustrates this problem and its solution by the use of special "root item" pointers.

The new device description table DDT2 in its field PSS refers to a new entry point for the reproduction sequence, defined by a selection item SEL3 in area PSS2. Selections at this item lead to further items (not shown) in a manner similar to that of FIG. 4. At the same time, the sequence and selection items of FIG. 4 can be found in the area PSS1, and new selection item SEL3 includes a reference to the entry point item SEL1 of the first session. This reference can be derived from a mere inspection of the old disc description table DDT1, field PSS, at the time of writing the new session.

References in the old sequence and selection area PSS1 cannot be altered, however, so how can references in the old sequence and selection area PSS1 lead back in an orderly fashion to the remainder of the compound sequence, defined in the new area PSS2?.

Returning briefly to FIG. 4, three references to the entry point or root item SELL are circled, these being the references in field NAA of item SEQ1, in field NAA of item SEQ2 and in field SA#4 of item SEL2. Other references to item SEL1 will typically be found in the previous action reference in field PAA of items SEQ1, SEQ2 and SEL2, and field PAA of item SEL1 itself.

In the solution proposed in FIG. 8, at least one and possibly all of the references to the root item is replaced by a special root item reference, not being the address of any stored item. Where references comprise three-byte BCD coded time-codes, for example, the reference comprising all "1"s (FF FF FF hex) is not a valid address. This special root reference, indicated "R" in FIG. 8, can be used by the player as a reference "back" into sequence and selection items (SEL3) stored in later sessions, even though these later sessions were not planned at the time of storing the first session.

To recognise the special root reference, a simple modification of the program stored in ROM for the microcontroller MCU (FIG. 1) can implement a test upon entry to the step 504 (FIG. 6), as indicated at 524 and 526 in the flowchart of FIG. 6. If an item reference is found to be equal to the special root reference, then the true item reference is found by reference to field PSS in the disc description table DDT, as shown by dotted paths R in the flowchart.

Bearing in mind that in step 502 the microcontroller refers always to the most up-to-date table DDT on the record carrier, the apparatus will behave predictably both when there is only one session stored on the disc (FIG. 4 situation), and also when one or more session have been stored at a later date (FIGS. 7 and 8). In the latter case the root item reference enables the compound reproduction sequence to pass back and forth between parts defined in different sessions, with no user intervention. The author of each session can decide whether to use a direct reference to an item or to use indirect root item reference in a given field in a stored sequence or selection item. Provided at least one root item reference is used (for example as the previous action reference PAA in the entry point item of the session (SEL1 in FIG. 4)), control can be passed from the current sequence to one defined in a session stored at a later date (SEL3 in FIG. 8).

The skilled reader will also appreciate that the embodiment described can be varied in many ways while retaining the advantages of the invention, to include further features and/or to provide compatibility with systems other than Photo CD. For example application of the inventive concept would be possible even in a purely audio or text-based reproduction apparatus. Further attributes can be added to the item references to improve the system. For example each image reference (format IM) might include fields specifying windowing, zooming and rotation characteristics relative to the stored image, to allow a more flexible display. These features can be implemented in the player by suitable control of the video controller chip described in the paper by Petruzelli et al. Also in the player, the details of implementation, in terms of the key labelling, mechanics, the use of pointers and on-screen displays for user interaction and so forth, can be freely varied by the designer, so long as compatibility with the stored item formats is ensured. Manually-programmed access may be provided to the individual user information items, plus random playback (shuffle play) and so forth.

Random selection could be implemented for example by defining a flag in the header SELH of a selection item which would cause the player to make a random selection from among the references SA#1 to SA#N, immediately or after the time-out period. Alternatively, a special value of the time-out action reference field TAA might be used to cause random selection.

A feature of most computer-based interactive systems is that menu selections can be made by pointing physically or with a cursor to certain areas or "hot-spots" on the menu display. While the presently proposed Photo CD player would not have such a capability, many microcontroller-controlled consumer apparatuses such as televisions and VCRs now have on-screen menu displays, and hot-spot menu selection is potentially a useful feature in such systems. FIG. 5 shows a selection areas item format RECT which can define hot-spots corresponding to the selection options in a selection item (format SEL). Item RECT can be stored as an auxilliary to each selection item SEL, the selection item including a reference RECTA giving the address of the item RECT. The item RECT can then be assessed by players with hot-spot capability, but ignored completely by players without such capability.

Following a header field RECTH, the item format RECT includes a series of rectangle definitions, for example in the form of pairs of pixel coordinate locations defining the top-left and bottom-right pixels of the rectangular hot-spot area. Fields PARECT and DARECT contain rectangle definitions corresponding respectively to the previous action and default action references in fields PAA and DAA of the corresponding selection item SEL. These are followed by a number of rectangle definitions RECT#1 to RECT#N, which define hot-spots corresponding on a one-to-one basis with the selection references SA#1 to SA#N of the selection item SEL. A field NRECT in the item format RECT stores the number of such rectangle definitions, and will usually be equal to field NS in the corresponding selection item SEL.

Figure 9:
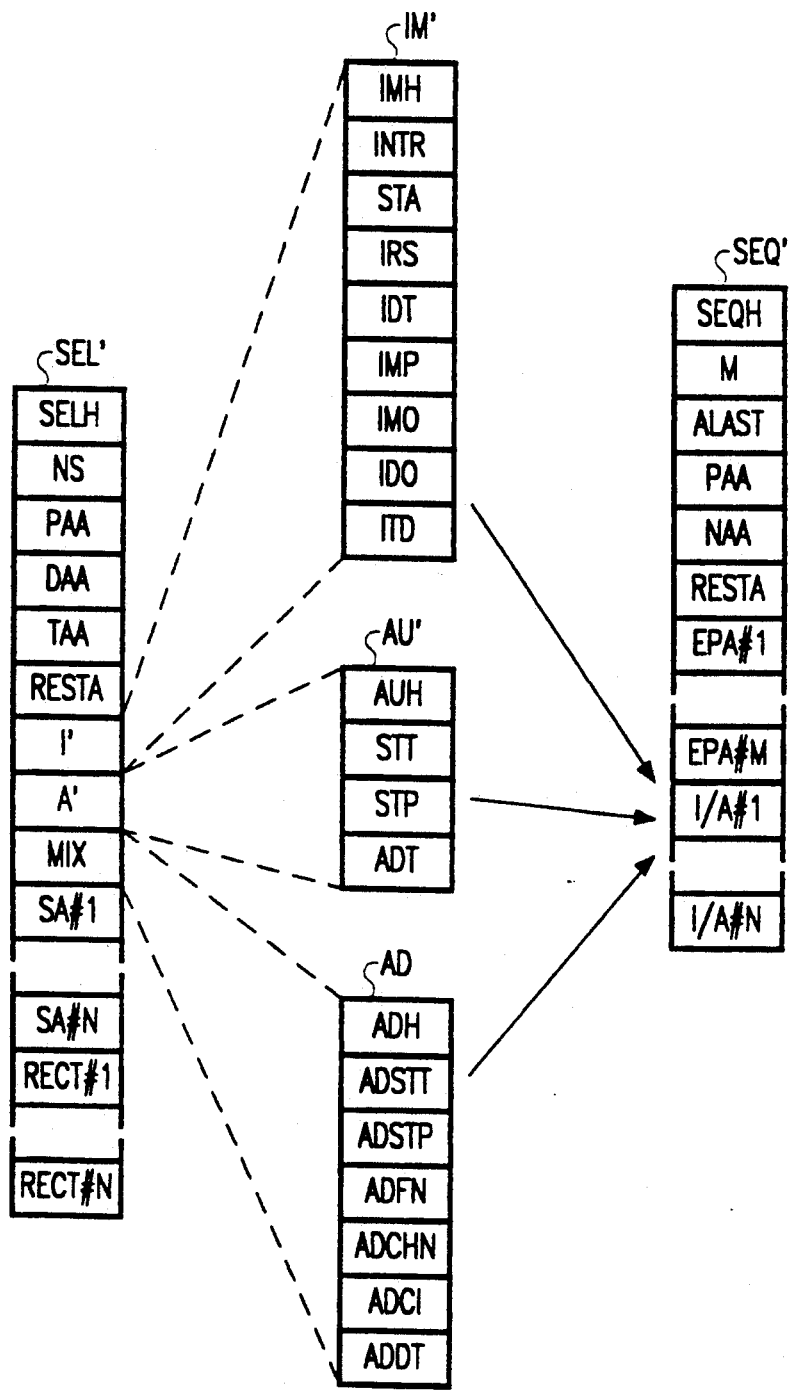
FIG. 9 shows modified formats for the storage of a selection item, sequence item, an image item reference, an audio item reference and a reference to a third type of user information item combining images and compressed audio in a real-time sequence.

FIG. 9 illustrates an alternative embodiment in which the microcontroller-readable items SEL, SEQ, IM and AU are modified, and a new user information item type is included comprising a real-time mixture of images and sound. To play the new information type additional features are included in the apparatus, as shown in broken lines in FIG. 1, and a new format AD is defined for a corresponding entry in the selection items and sequence items.

The new type of user information item comprises sectors of compressed audio data interleaved with sectors of image data, to define a real-time sequence of images with simultaneous sound. This might comprise for example recorded music together with photographs of the artiste or composer. The compression technique employed is that of adaptive differential pulse code modulation (ADPCM). This technique, and the manner of interleaving image and audio sectors in this way are known already in the standard CD-I system mentioned in the introduction, and also in the CD-ROM XA standard. The CD-I system is described in the book "Compact Disc Interactive: A Designer's Overview", edited by Philips International and published by Kluwer Technical Books, ISBN 90 201 21103.

In the modified apparatus of FIG. 1, an ADPCM decoder ADEC is included. The interface circuit IFC is modified to receive an interleaving factor specified by the microcontroller MCU and to de-interleave the sectors of the data CDD read from the record carrier RC. Thus the ADPCM audio sectors are routed to the decoder ADEC, and only the image data sectors are routed to the video controller module VC.

The modified selection item SEL' includes the following fields corresponding exactly to fields in the embodiment of FIG. 5: SELH, NS, PAA, DAA, EAA, TAA, SA#1 to SA#N. The selection area fields RECT#1 to RECT#N are included in the selection item itself eliminating the separate item RECT. The number NS defines the number of selection area fields RECT# as well as the number of selection address fields SA#.

In the modified selection item SEL' the time-out period is no longer specified by a separate value field TAV. Instead, the time-out period is determined by the delay periods IDT, ADT etc., specified for the user selection information items. A new field RESTA is defined for a restart address. This refers to a selection or sequence item defining a restart point for the composite reproduction sequence, to which the user can then skip by a single selection. This can provide a quicker method of access than repeated operation of the "previous" button. The restart point may differ from the root item of the composite production sequence (SP1, FIG. 2), for example to avoid repetition of a set-up procedure in which the user selects different language versions of the programme. The restart point can also differ from item to item, for example to cause return to a chapter heading, rather than to the very beginning of the composite reproduction sequence.

Three entries are now defined for user selection information items: I', A' and MIX. Entry I' is an image entry of modified format IM'. Entry A' is an audio entry of the same format AU as used in the first embodiment. Entry MIX is an entry of a new format AD, described below.

The modified image entry format IMI includes fields IMH, STA, STP and IDT are identical to those in the format IM of FIG. 5. A new field INTR specifies the interleaving pattern in case non-image data sectors have been interleaved with the image data, as described below. Other new fields are included for image display attributes.

Field IRS indicates the recommended resolution level for display of the image. As described in the ICCE '91 papers referred to in the introduction, the Photo CD format stores each image at a range of different resolutions, allowing a compromise between the quality of the displayed image and the time taken for display. Fields IMP and IMO specify an amount of panning and a magnification factor respectively, causing the display of an enlarged portion of the stored image. Field IDO specifies the orientation for display of the image, which may be rotated relative to the orientation in which the image is stored. Lastly field ITD contains an image transition descriptor which, for a suitably equipped reproducing apparatus, specifies a particular form for the transition from the previous image to this image. The available transition types may include for example the various "wipes" and "fades" which are well known to the person skilled in the art.

The CD-DA audio entry format AU is unchanged from the embodiment of FIG. 5. The new entry format AD begins with a header field ADH identifying the format AD. This is followed by fields ADSTT and ADSTP specifying the start and stop addresses respectively of the data defining the real-time sequence information item. Field ADFN contains a file number for the interleaved data sectors, while ADCHN specifies which audio channel is to be played. The Philips/Kluwer book describes how sectors containing alternative audio information (for example speech in French and English) can be interleaved in the same data file and selected by channel number when reproduced.

The channel selection is conveniently performed by the interface circuit IFC at the same time as the audio and image sectors are de-interleaved. Some control information for the ADPCM audio decoder ADEC is contained in field ADCI, while a delay time is specified in field ADDT, corresponding to the fields IDT and ADT of the image and CD-DA audio formats.

FIG. 9 also shows a modified sequence item SEQI. Fields SEQH, PAA, NAA and I/A#1 to I/A#N have the same meaning as in the first embodiment (SEQ, FIG. 5). Instead of storing the number NS of entries, the sequence item SEQ' has a field ALAST containing a pointer to the last entry I/A/#N. There is also a restart address field RESTA having the same function as that in the selection item SEL', described above.

A new group of fields EPA#1 to EPA#M store entry point addresses. These are provided to assist in the operation of the next action and previous action options within the sequence. Consider for example a sequence in which a number of image items (format IM') are presented in sequence, each followed by one or more audio items containing verbal notes on the image. When the user selects "previous action" in the middle of such a sequence, it is not generally appropriate for the player simply to step back to the preceding entry in the sequence list. This could lead to the reproduction of an audio item which did not correspond to the image presently displayed.

Accordingly, the entry point address fields EPA#1 to EPA#M are used to point to a subset of the entries I/A#1 to i/A#N, thereby marking them as entry points to the sequence. In the example just described, the entry point addresses would be stored so as to refer to the image entries, but not the intervening audio entries. The player then responds to the "previous action" command by stepping back to the most recent entry which was marked in the list of entry point addresses. The "next action" command would cause a step forward to the next following entry marked in the entry point address list.

From reading the present disclosure, other modifications will be apparent to persons skilled in the art. Such modifications may involve other features which are already known in the fields of storage methods and recording/reproducing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of storing a plurality of user information items on a record carrier for subsequent presentation to a user, the method including the steps of:
   storing the plurality of user information items at addressable locations on the record carrier;
   defining a desired composite reproduction sequence for the user information items, the composite reproduction sequence comprising at least two linear reproduction sequences and at least one selection point at which the desired composite reproduction sequence can branch to one of a plurality of alternative reproduction sequences dependent on a user selection response;
   for each said linear reproduction sequence in the desired composite reproduction sequence defining and storing on the record carrier a sequence item comprising an ordered list of references to said user information items stored on the record carrier; and
   for each said selection point in the composite reproduction sequence defining and storing a selection item including a selection list comprising for each said user selection response a reference to a stored sequence item or said selection item.

2. A method as claimed in claim 1, wherein a user selection information item is stored on the record carrier, to be presented to a user at the at least one selection point, the corresponding selection item including a reference to the stored user selection information item.

3. A method as claimed in claim 2, wherein the user selection information item comprises a menu image identifying for the user the alternative reproduction sequences available at the relevant selection point.

4. A method as claimed in claim 1, wherein the user selection information item comprises an audible menu description identifying for the user the alternative reproduction sequences available at the relevant selection point.

5. A method as claimed in claim 1, wherein each stored user information item can be one of at least two distinct types, and wherein said each selection item includes fields for reference to one item of each type to be presented to the user at the selection point.

6. A method as claimed in claim 1, wherein each stored sequence item includes a field for a next action reference defining a continuation of the composite reproduction sequence after the linear reproduction sequence defined by said sequence item.

7. A method as claimed in claim 1, wherein each said sequence item includes a field for a previous action reference referring to a selection item or sequence item preceding the stored sequence list in the composite reproduction sequence.

8. A method as claimed in claim 1, wherein said each selection item further includes a field for a previous action reference referring to a selection item or sequence item preceding the selection item in the composite reproduction sequence.

9. A method as claimed in claim 1, wherein said each sequence item includes a pointer to the last item reference in the list contained therein.

10. A method as claimed in claim 1, further comprising defining for each given sequence a subset of the user information items of the sequence to act as entry points for the corresponding sequence, and storing within the given sequence item an entry point list identifying the said subset.

11. A method as claimed in claim 1, wherein two or more sets of said user information items with associated sequence and selection items can be stored at different times on the same carrier in successive storage sessions, each storage session leaving accessible the user information items and the sequence and said selection items of previous sessions while certain other control information is effectively replaceable at each session and wherein at least one item reference in a sequence or selection item is an indirect reference via a field in the replaceable control information.

12. A method as claimed in claim 11 wherein the replaceable control information includes a carrier description table having a field for a main entry point reference referring to a sequence or selection item which defines a main entry point in the composite reproduction sequence, at least one reference to the said item in a stored sequence or selection item comprising the said indirect reference.

13. A method as claimed in claim 12 wherein the item references generally comprises encoded addresses for the locations of the items referred to, while the indirect item reference comprises a fixed code not corresponding to any valid address.

14. A method as claimed in claim 1, further comprising the steps of: (i) defining for a given selection point a set of selection areas on a menu image corresponding to at least a subset of the user selection responses possible at the given selection point and (ii) storing in the selection item corresponding to the given selection point a selection areas list identifying each defined selection area.

15. A method as claimed in claim 1 wherein the selection item(s), sequence items and disc description information are stored on the record carrier with a lower information density than the user information items, so as to enable reading of sequence items and selection items at a reduced data rate.

16. A record carrier wherein user information items have been recorded by a method as claimed in claim 1.

17. A record carrier as claimed in claim 16, comprising an optical memory disc conforming to the CD-ROM-XA standard.

18. An apparatus for reproducing user information items stored on a record carrier in accordance with a method as claimed in claim 1, the apparatus including means for reading and reproducing said user information items from specified locations on the record carrier and control means for reading control information from the record carrier and for specifying to the reproducing means the locations of user information items to be reproduced, the control means including sequence and selection activation means, selection control means and sequence control means, wherein:

the activation means comprises means for receiving an item reference and for (i) in the event that the received item reference is a reference to a selection item activating the selection control means in respect of the said selection item and (ii) in the event that the item reference is a reference to a sequence item activating the sequence control means in respect of the said sequence item;

the selection control means comprises means for in respect of a given selection item receiving a user selection signal, identifying a corresponding item reference in the selection list of the given selection item and supplying the corresponding item reference to the activation means, and the sequence control means comprises means for in respect of a given sequence item causing the reproduction of stored user information items in a linear reproduction sequence as defined by the ordered list of item references in the given sequence item.

19. An apparatus as claimed in claim 18, wherein said previous user information item is selected by the means responsive to the previous action signal from a subset of the user information item references in the sequence list, which subset is identified by an entry point list also contained in the sequence item.

20. A reproducing apparatus as claimed in claim 19, wherein said identifying means is adapted to read one image item references of at least two distinct types from respective predetermined fields in the selection item and to cause reproduction of any stored user information items referred to, prior to receipt of user selection signals.

21. A reproducing apparatus as claimed in claim 18, wherein the sequence control means further includes means for at the end of the linear reproduction sequence supplying to the activation means an item reference read from a next action field of the sequence item.

22. A reproducing apparatus as claimed in claim 18, wherein the sequence control means includes means responsive to a previous action signal received from the user during reproduction of a user information item to cause a return to a previous user information item in the sequence, and in the event that the previous action signal is received during reproduction of the first item in the sequence, supplying to the activation means an item reference read from a previous action field of the sequence item.

23. An apparatus as claimed in claim 22, wherein said previous user information item is selected by the means responsive to the previous action signal from a subset of the user information item references in the sequence list, which subset is identified by an entry point list also contained in the sequence item.

24. A reproduction apparatus as claimed in claim 18, wherein the selection control means further includes at least one selected from the following list:

means responsive to a previous action signal received from the user for supplying to the activation an item reference read from a previous action field of the selection item;

means responsive to a default action signal received from the user for supplying to the activation means an item reference read from a default action field of the selection item; and means for detecting the passage of a time-out period prior to receipt of a user selection signal for supplying to the activation means an item reference read from a time-out action field of tile selection item.

25. An apparatus as claimed in claim 18, wherein the activation means includes means for determining whether a received item reference is an indirect item reference and if so using information stored elsewhere on the record carrier to obtain a direct reference to a sequence or selection item stored on the same record at a later date than the indirect reference itself.

26. An apparatus as claimed in claim 25, wherein the control means further comprises selection and sequence initiation means for reading from a main entry point item reference field in a carrier description table stored on the record carrier a reference to a selection or sequence item defining a main entry point to the composite reproduction sequence, the information used to obtain the direct reference from the said indirect comprising the said entry point reference field in the carrier description table.

27. An apparatus as claimed in claim 18, wherein the apparatus includes selection control means further including means for presenting a menu image to the user and means for receiving user selection signals in which the user indicates a location on the displayed menu image, means for reading a selection areas list from within the given selection item and for using selection area definitions in the selection areas List to determine whether the user's indication of a location on the menu image constitutes a user selection signal identifying a corresponding item reference in the selection list of the given selection item.

28. A reproducing apparatus as claimed in claim 18, wherein the selection item(s), sequence items and carrier description table are read from the record carrier at a lower data rate than the user information items.

* * * * *